Sept. 15, 1936.                J. DERRY ET AL                    2,054,476
                             POWER MOLDING PRESS
                    Filed May 31, 1934           5 Sheets-Sheet 4
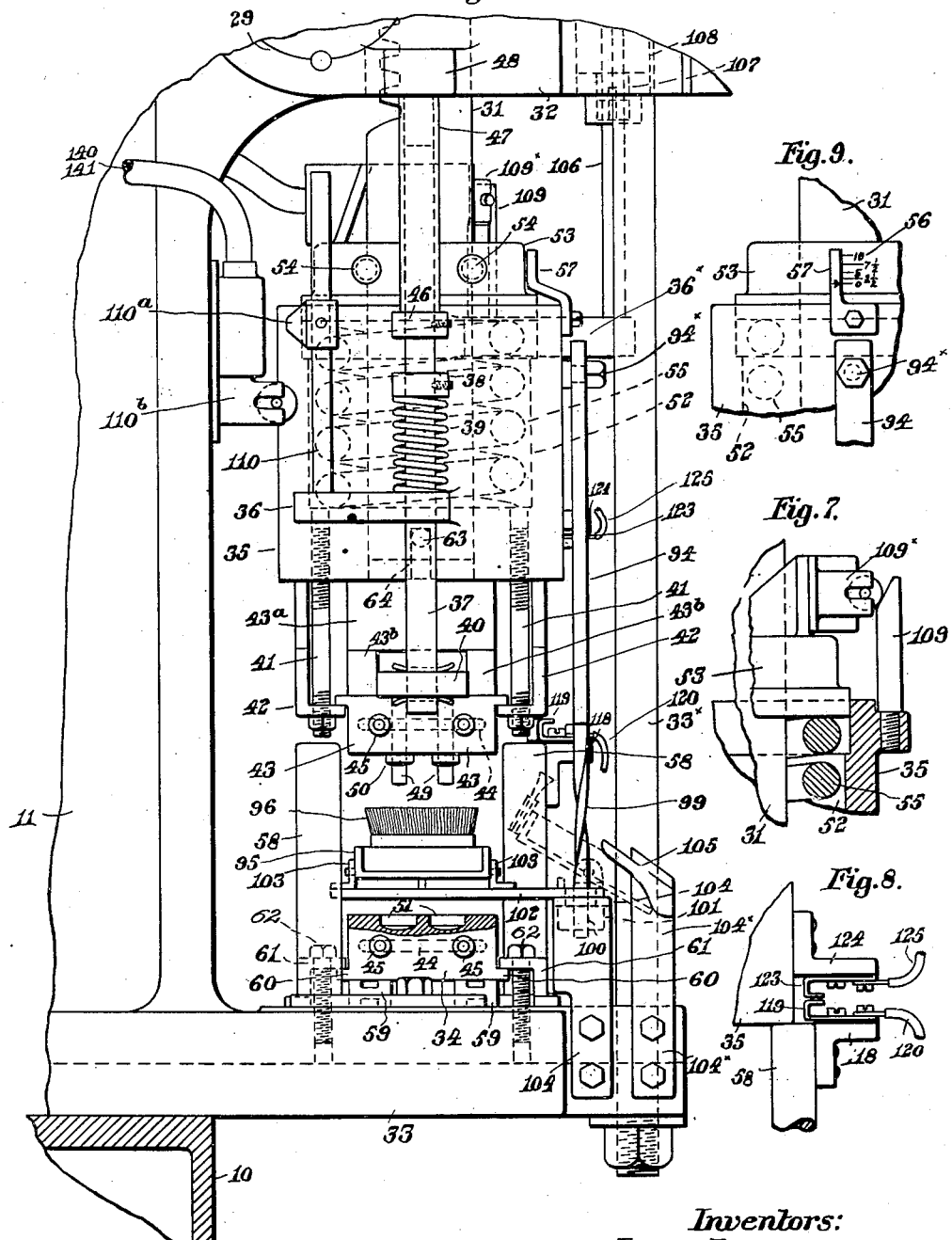
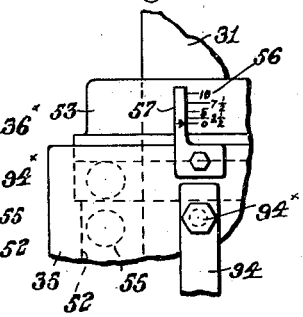
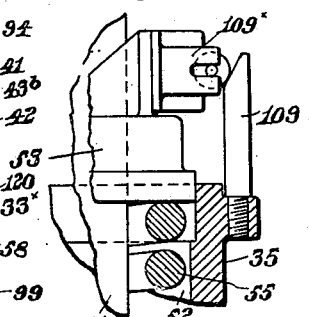
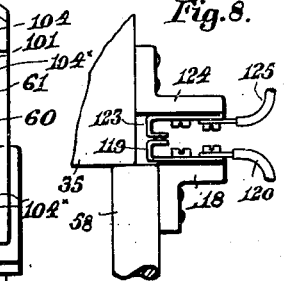
Inventors:
Jasper Derry,
Edwin A. Terkelsen,
by Walter E. Lombard, Atty.

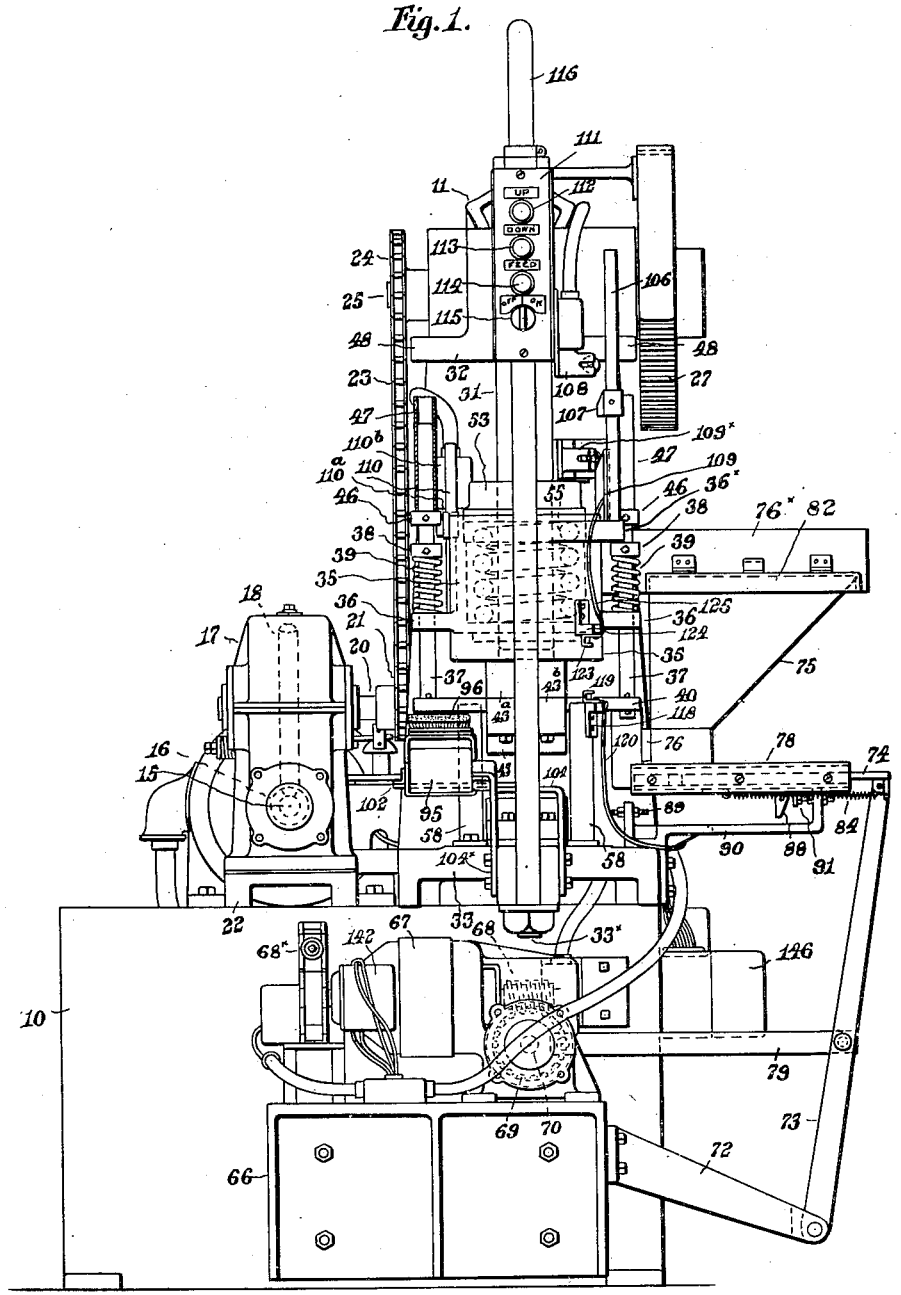

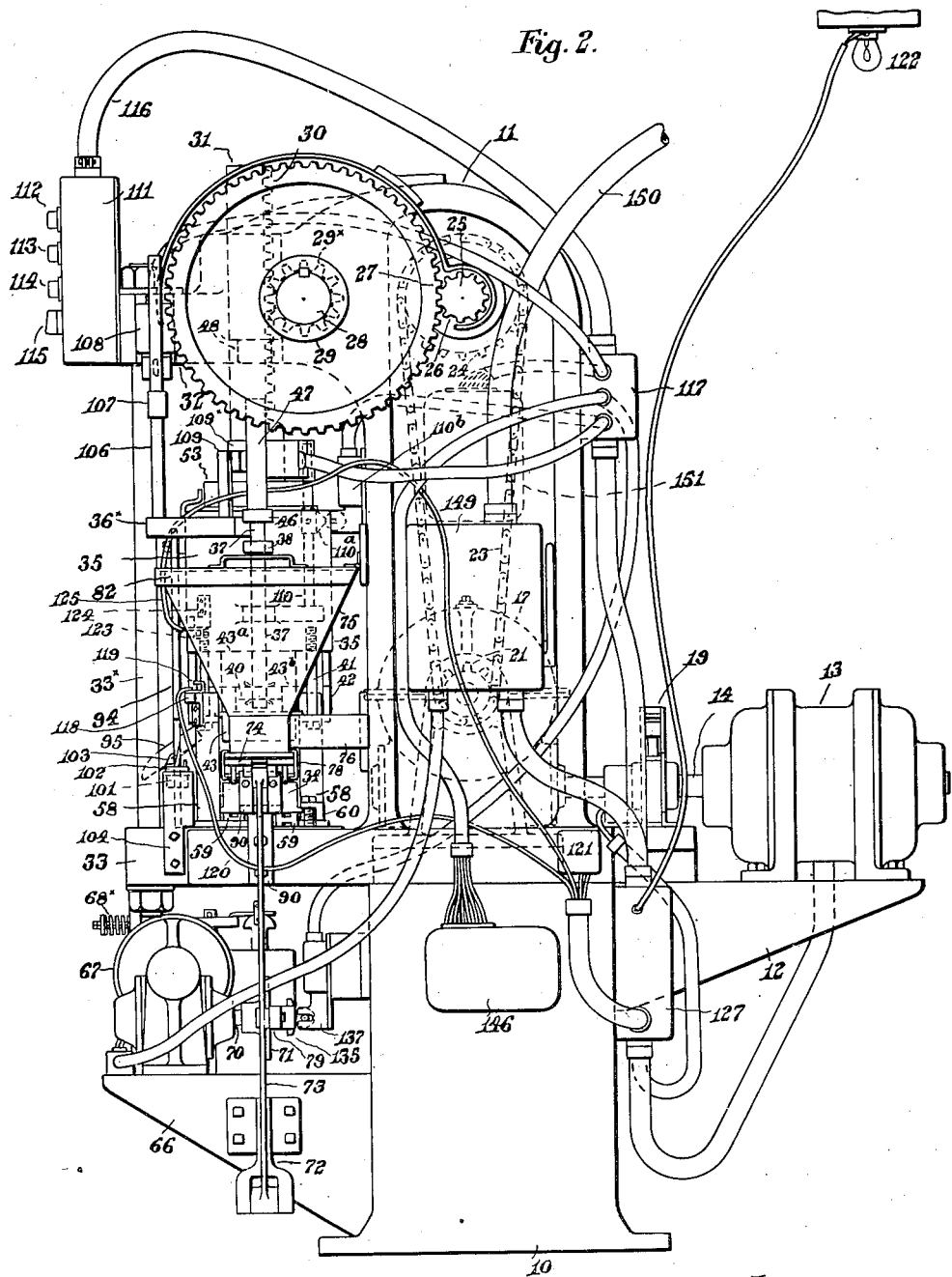

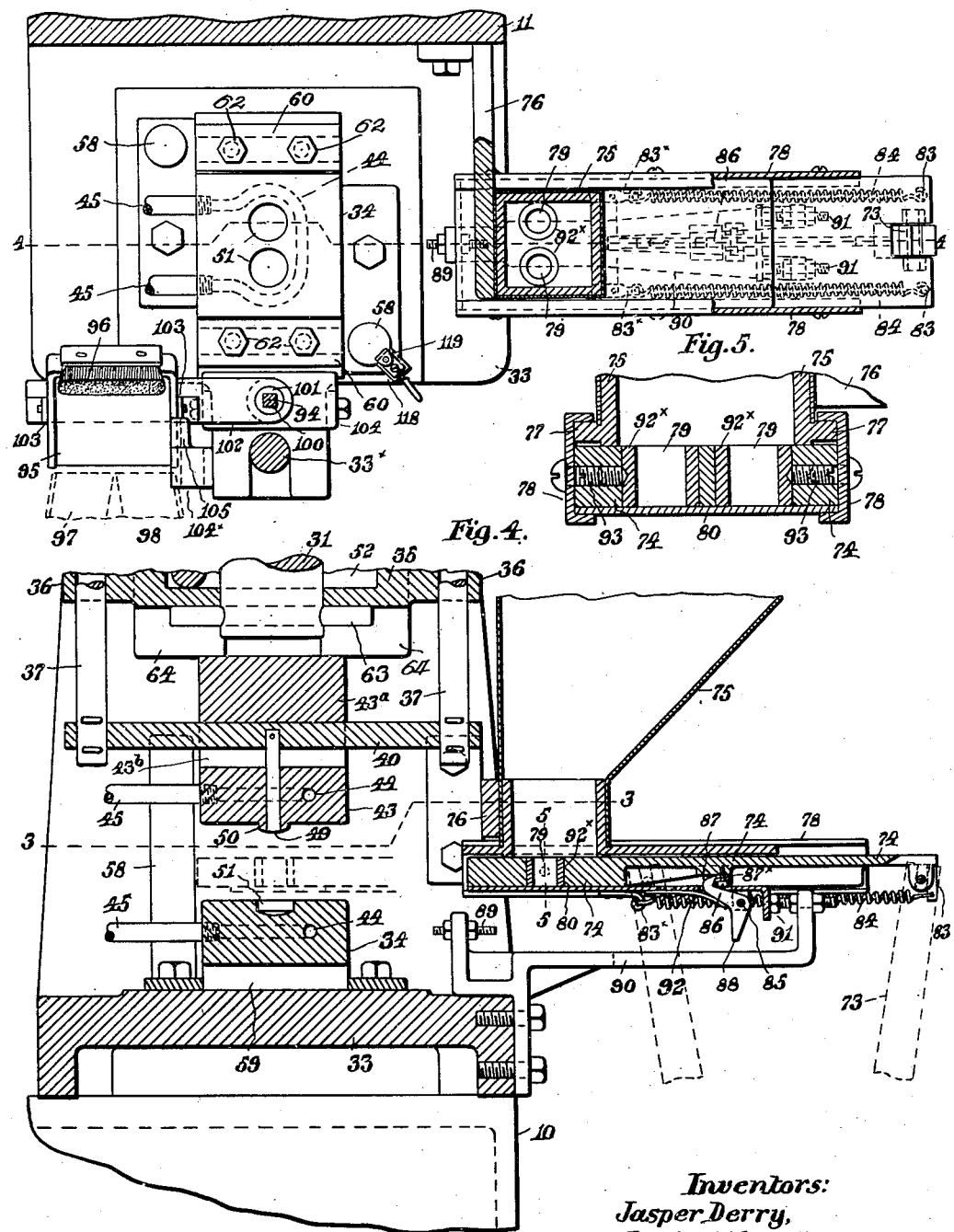

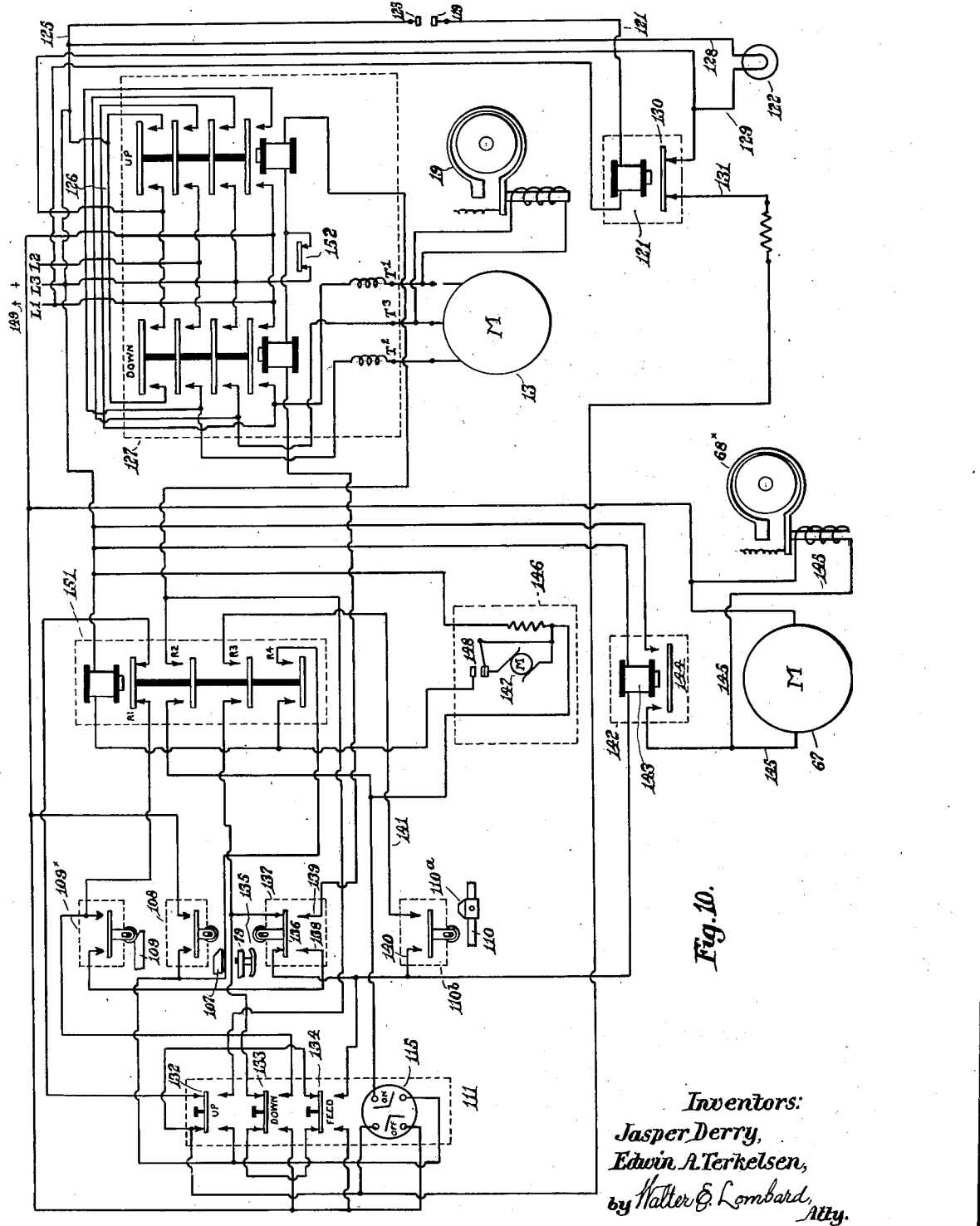

Patented Sept. 15, 1936

2,054,476

UNITED STATES PATENT OFFICE 2,054,476

POWER MOLDING PRESS

Jasper Derry, Medford, and Edwin A. Terkelsen, West Roxbury, Mass., assignors, by mesne assignments, to Terkelsen Machine Company, Boston, Mass., a corporation of Massachusetts Application May 31, 1934, Serial No. 728,320

12 Claims. (Cl. 18—17)

This invention relates to molding presses and more particularly to presses of this character in which thermo-plastic molding material is fed to molds subjected to heat, and then compressed in the molds while heated and in a coalesced condition, the main object of the invention being the provision of a machine which will operate automatically with all the operations of the working parts thereof synchronized.

Another object of the invention is the prevention of any downward movement of the ram or die head until the loading operation has been completed.

A further object of the invention is the provision of means whereby a follow-up pressure may be given to the molded articles after the initial pressure imparted thereto by movement of the separable molds toward each other.

These objects are attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings

Figure 1 represents a front elevation of a press embodying the principles of the present invention.

Figure 2 represents a right side elevation of the same.

Figure 3 represents a horizontal section of a portion of the press on line 3, 3 on Fig. 4.

Figure 4 represents a vertical section on line 4, 4 on Fig. 3.

Figure 5 represents a vertical transverse section on line 5, 5 on Fig. 4.

Figure 6 represents an enlarged front elevation of a portion of the press.

Figure 7 represents a detail in section showing the means for stopping the downward movement of the die head.

Figure 8 represents a detail showing the electric contacts for operating a signal lamp.

Figure 9 represents a detail showing the means of indicating the pressure which the die head is adapted to give during the molding operation, and Figure 10 represents diagrammatically the electrically operated devices and wires connecting the same.

Similar characters indicate like parts throughout the several figures of the drawings.

In the drawings, 10 is a press bed having surmounted thereon and secured thereto a press frame 11.

To the rear of the bed 10 is secured a shelf 12 having surmounted thereon an electric motor 13, the shaft 14 of which is connected in any well known manner to a worm shaft 15 having a worm 16 mounted thereon in a casing 17 in which is enclosed a worm gear 18 meshing with said worm 16.

The motor 13 and worm reduction gearing 15, 16 are of usual construction and need not be illustrated in detail.

Associated with the motor 13 is a magnetic brake 19 of usual construction, said brake being adapted to control the starting and stopping operation of said motor.

The worm gear 18 is secured to a shaft 20 rotatably mounted in bearings formed in said casing 17 and having secured thereto a sprocket wheel 21.

The casing 17 is mounted upon a base 22 secured to the upper face of the bed 10.

The sprocket wheel 21 is connected by a sprocket chain 23 with a sprocket wheel 24 secured to one end of a shaft 25 rotatably mounted in the press frame 11.

The opposite end of said shaft 25 has secured thereto a pinion 26 meshing with a large gear 27 secured to a shaft 28 rotatable in bushings 29 in the upper end of the press frame 11.

The shaft 28 has formed thereon intermediate its end pinion teeth 29x which mesh with rack teeth 30 formed upon a plunger 31 movable vertically in an elongated bearing formed in a forward projection 32 on the upper end of said press frame 11.

The lower end of the press frame 11 has a forward extension 33 which is connected at its forward end by means of a tie rod 33x with the forward end of the projection 32.

The forward projection 33 forms a platen on which rests the lower mold 34.

Surrounding the lower end of the plunger 31 is an upper die head 35 having oppositely disposed ears 36 through which extend guide rods 37 having collars 38 adjustably mounted thereon and secured thereto.

Between these collars 38 and the ears 36 are springs 39.

The lower ends of the guide rods 37 are secured to a cross plate 40 beneath the die head 35.

Depending from the die head 35 are rods 41 having rails 42 adjustably mounted on their lower ends, these rails forming supports for the upper mold 43.

The plunger 31 and die head 35 form a ram adapted to move the upper half 32 of the separable mold to and from the lower half 34 of said mold.

The molds 34 and 43 are provided with chambers 44 therein to which steam or other heating element is admitted from any suitable source through the pipes 45, thus keeping the molds heated during the molding operation.

The cross plate 40 is movable between the upper mold 43 and the die head 35 and the vertical guide rods 37 extend upwardly therefrom through ears 36 on the die head 35.

The springs 39 between the ears 36 and collars 38 under normal conditions retain the plate 40 in contact with the under face of head 35, as shown in Fig. 1.

Above the collars 38 and surrounding the rods 37 are collars 46 adjustably secured to said rods and resting on these collars 46 are sleeves 47.

In the upward movement of the die head 35 the upper end of the sleeves 47 come into contact with the ears 48 on the frame 11 and stop the upward movement of said rods 37, thereby causing the plate 40 to be brought into contact with the upper face of the mold 43, as shown in Fig. 6.

The bar or plate 40 has extending downwardly therefrom two kick-off pins 49 extending through dies 50 extending downwardly from the upper mold 43 and registering with the cavities or depressions 51 in the lower mold 34.

In the downward movement of plate 40 the kick-off pins 49 force the molded articles from the dies 50.

The die head 35 is provided with a central chamber 52 closed at the top by a cap 53 secured to the plunger 31 by tapered pins 54 and reciprocable in the chamber 52.

Within the chamber 52 is a powerful compression spring 55 capable of sustaining great pressure, the exact pressure being indicated by the scale 56 on the cap 53 and the pointer 57 secured to said die head 35.

Secured to the forward extension or platen 33 are vertical members 58 adapted to limit the downward movement of the die head 35.

The lower mold 34 rests on blocks 59 and has side flanges 60 over which extend clamping members 61 secured to the platen 33 by bolts 62.

Between the upper mold 43 and the bottom of die head 35 are clamped blocks 43a and 43b.

Extending through the lower end of plunger 31 is a transverse pin 63, the ends of which are disposed in vertical slots 64 in the lower end of the die head 35, thus permitting relative movement between said head and plunger while preventing rotation of either member relatively to the other.

The plunger 31 is fitted to a hole in the bottom of the die head 35.

The compression spring 55 is adapted to give a desired follow-up pressure to the molded articles after the initial pressure thereof has been completed by the separable molds 34, 43.

During the molding operation the lower ends of pins 49 are flush with dies 50 and coact therewith.

The depressions 51 in the lower part 34 of the separable mold may be of any required shape and the die members 50 in the upper part 43 of the mold are shaped to conform to the shape of the cavities 51, said dies being adapted to force the molding material into all the spaces between the dies 50 and the walls of said depressions 51.

To the front of the base 10 is secured another shelf 66 on which is mounted an electric motor 67, the shaft of which is provided with a worm 68 meshing with a worm gear 69 on a transverse shaft 70 having a crank disk 71 secured to its rear end.

Associated with the motor 67 is a magnetic brake 68x of usual construction, said brake being adapted to control the starting and stopping operation of said motor.

From the shelf 66 extends an arm 72 to the outer end of which is pivoted a rocker lever 73, the upper end of which is pivotally connected to a loading plate 74 adapted to be reciprocated endwise beneath an open ended hopper 75 adapted to contain the material to be used in the molding operation.

This hopper 75 is fixedly secured to frame 11 by brackets 76, 76x, and has horizontal side flanges 77 on which reciprocate U-shaped members 78 secured to the opposite sides of the loading plate 74.

The lever 73 is connected by a link 79 to the crank disk 71.

At each rotation of the crank disk 71 the loading plate 74 will be reciprocated beneath the hopper 75.

This loading plate 74 is provided with openings 79 therein to receive a limited quantity of molding material as the said plate is moved to the left beneath the lower open end of the hopper 75.

These openings 79 extend through the loading plate 74 and are closed at the bottom by a bottom plate 80 which is connected to said loading plate in a manner to be hereinafter described whereby the bottom plate 80 will move a limited distance with the loading plate and then be disconnected therefrom when the openings 79 in the loading plate are positioned over the lower mold 34, thereby permitting the material in said pockets 79 to drop into the depressions 51 in the lower mold 34.

The hopper 75 is provided with a closing cover 82.

The die members 50 on the upper part 43 of the mold register with the openings 79 in the horizontally actuated slide 74 when said slide is at the extreme of its inward movement.

The bottom plate 80 moves with the slide 74 until the openings 79 in the slide 74 are nearly over the cavities or depressions 51 and then the bottom plate 80 is moved from beneath the slide 74 to permit the molding material to drop into said depressions 51 prior to the downward movement of the dies 50.

The loading plate or slide 74 has at its outer end two downwardly extending pins 83 between which and two eyes 83x on the bottom plate 80 are springs 84 which are adapted to retract said plate 80 when the plate is released from the slide or loading plate 74.

Pivoted at 85 on two ears on the bottom plate is latch 86, one end of which is provided with a hook 87 coacting with a lug 87x on the under side of the slide 74 so that when said slide moves toward its loading position, the latch 86 is caused to engage with the lug 87x when they are opposite each other by means of the flat spring 92.

The bottom plate 80 being retained from horizontal movement by the adjustable stop 81 causes the springs 84 to be expanded at all times, when the slide 74 moves the bottom plate 80 toward the loading position the springs 84 are further expanded.

The latch 86 has a downward arm 88 which at a point near the end of the inward movement of the loading plate 74 contacts with the adjustable stop member 89 on the bracket 90 secured to the side of the extension 33 and moves the latch 86 about its pivot 85.

When the latch 86 is thus moved about its pivot the bottom plate 80 is unlocked from loading plate 74, thereby permitting the bottom plate 80 to be returned by springs 84 to a position in contact with the adjustable stops 91 at the outer end of the bracket 90.

The latch 86 is retained normally in locked position by the flat spring 92 secured to bottom plate 80.

In the loading plate 74 are inserted tubular members 92x preferably of wood and having the openings 79 therein.

Wood is preferably used for these members as the molding material does not stick thereto and better results are therefore attained.

The members 92 are secured in position by the screws 93 threaded to the slide or loading plate 74.

Pivotally mounted on the front of the press at 94 is a delivery chute 95 having at its rear end an upwardly extending brush 96.

After the articles have been molded and the plunger 31 has moved upwardly a sufficient distance to admit this delivery chute 95 between the two parts 34, 43 of the mold, the chute 95 is moved about the axis of its pivot member 94 causing the brush 96 to wipe off any surplus molding material remaining on the upper part 43 of the mold.

When the dies 50 move upwardly the molded articles adhere thereto and move upwardly therewith a sufficient distance to allow the chute 95, while in horizontal position, to be moved beneath the dies 50 and the molded articles thereon.

The kick-off pins 49 force the molded articles from the dies 50 into the chute 95 and then the chute swings about the axis of its pivot member 94 toward the front of the machine where it is tilted to allow the molded articles to move down the inclined surface of the chute 95 into one or more receptacles in position to receive the same.

Where two articles are being molded at the same time, one being the bottom of a box and the other the top of the box, it is preferable to have two passages 97, 98 near the delivery end of said chute so that all of the bottoms will go into one passage 97 and all of the tops into the other passage 98, thereby making it possible to deliver the bottoms into one receptacle and the tops into the other receptacle.

The pivot member 94 for said chute is a vertically movable non-rotatable square bar having a twist 99 therein, said bar fitting a square opening 100 in a lug 101 secured to a plate 102 having upwardly extending ears 103 on which the chute 95 is tiltingly mounted.

Between the plate 102 and shoulders on the lug 101 is a U-shaped support 104 secured to the extension 33 which prevents any vertical movement of the plate 102.

The upper end of the bar 94 is secured at 94x to die head 35 and moves therewith.

This twist 99 in the square bar is so located at a point in the length thereof that in its movement through the lug 101 it will oscillate the chute 95 at the proper time to move it into position to receive the molded articles and then deliver them.

The extension 33 has another member 104x projecting upwardly therefrom with a cam 105 at its upper end with which the forward end of chute engages as it moves forward and causes said chute to be tilted into the position shown in dotted lines in Fig. 6.

The die head 35 has extending upwardly from an ear 36x thereon a square bar 106 having a sleeve 107 adjustably mounted thereon which in the movement of the die head 35 coacts with a limit switch 108 secured to the right side of the forward projection 32 of the frame.

The die head 35 also has another shorter bar 109 extending upwardly from the ear 36x and the upper end of which is bevelled, which coacts with a limit switch 109x secured to the spring cap 53.

Extending upwardly from the ear 36 is a bar 110 having adjustably mounted thereon a member 110a which operates a limit switch 110b.

These limits switches 108, 109x, 110b, and the feed limit switch to be hereinafter described, are of usual construction making it unnecessary to illustrate the same in detail.

The limit switch 108 on the upward movement of die head 35 limits the upward travel of said die head; the limit switch 109x limits the downward movement of the plunger 31 and regulates the pressure of the dies 50; and the limit switch 110b controls the time of starting of the loading mechanism.

To the front end of the projection 32 is secured a controlling device 111 with three push members 112, 113, 114, marked "Up", "Down", and "Feed", these push members operating switches in an electric circuit in which are all of the magnetic brakes and limit switches as will be hereinafter described.

At the lower end of this controlling device is an oscillating switch member 115 which is adapted to permit automatic or manual control of the individual operations of the press.

The switch 115 may be moved to a neutral position and when in this position the push buttons 112, 113, 114 may be actuated to permit certain individual operations of the machine.

As this controlling device is of usual construction it is deemed unnecessary to show the same in detail.

From the top of the controlling device the BX cable 116 extends to junction box 117 on the back of the frame 11.

One of the posts 58 has secured thereto a bracket 118 having a contact member 119 thereon from which a wire 120 leads to a magnetic contactor 121 which when closed lights a signal lamp 122.

The contact member 119 coacts with another contact member 123 on a bracket 124 secured to the die head 35 near the bottom thereof and from which a wire 125 extends to a wire 126 forming a part of the magnetic reversing switch 127.

A wire 128 leads from the wire 125 to lamp 122, another wire 129 leading from said lamp 122 to the armature 130 of the magnetic contact 121.

A wire 131 leads from armature 130 to the normally closed "up" switch 132 of the controlling device 111 on the front of projection 32.

Every time the die head 35 moves downwardly to close the contact between the members 119, 123, the magnetic contactor 121 is actuated and the circuit to the lamp 122 is broken by movement of armature 130.

When there is too much material in cavities 51 or the molded articles are not kicked off the dies 50, the ram will be prevented from moving to its downward limit and the members 119, 123 will not contact thereby permitting armature 130 to be inoperative and permit the lamp 122 to light.

This will indicate trouble to the operator who will immediately stop the press and remove any obstruction therefrom.

In the diagram shown in Fig. 10 the switch 115 in the controlling device 111 is shown in the "off" position.

When the switch is in this position the press may be manually operated by pressing the buttons 112, 113, 114 and actuating the contacts 132, 133 and 134 coacting therewith.

In the control box 111 are springs forcing outwardly the buttons 112, 113, 114 as soon as pressure is released therefrom.

The switch 115 is only used in the "on" position when the press is to be operated automatically.

The member 110a on rod 110 is wedge-shaped with a flat face between the inclined faces thereof, thus permitting the feed starting switch 110b to be operated as the die head 35 moves either up or down.

On the link 79 is secured a cam 135 which normally keeps the bar 136 of feed limit switch 137 in position to close the circuit between the wires 138, 139, the magnetic brake 68x at this time retaining the motor 67 at a standstill.

When the member 110a passes the feed starting switch 110b it closes the circuit between wires 140, 141.

The wire 140 leads to a magnetic contactor 142 and energizes the magnet 143 thereof, causing the armature 144 to close the circuit 145 to motor 67 and brake 68x, releasing the latter and thus permitting the motor 67 to operate.

The crank 71 will then begin to rotate and cause the cam 135 to actuate the feed limit switch 137 moving the bar 136 into position to close the circuit between wires 138, 139.

The feed starting switch 110b is only actuated long enough to permit the cam 135 to ride off the feed limit switch 137 and permit the completion of the feed motor circuit.

At this time when the feed limit switch circuit is broken the die head 35 is prevented from moving downwardly as the circuit between wires 138, 139 is broken.

When the cam 135 is moved to operate the feed limit switch 137 the ram may move downwardly.

In other words, the cam 135 is coacting with the feed limit switch at all times when the ram is being moved and while the feed motor circuit is out of action.

The feeding of the loading slide 74 is accomplished while the crank 71 is making a complete cycle.

As soon as the cam 135 has made a complete cycle, it comes to a standstill, stopping further movement of the loading slide 74 and permitting downward movement of the ram.

The purpose of the feed limit switch 137 is to prevent the possibility of any downward movement of the die head 35 during the loading operation.

On the right side of the press is a time relay 146 of usual construction and including a self-contained synchronized motor 147 and switch 148 which may be set for the time it is desired to cure the material and compress the work.

On the right side of the press is also a line switch 149 of any well known construction to which a cable 150 leads from any suitable source of power.

In connection with the time relay 146 is a magnetic contactor 151 of usual construction which is adapted to retain the ram at a standstill in its downward position during the curing period of the molding material.

The magnetic reversing switch 127 is electrically connected to motor 13 so that it will not operate when there is any overload on the motor.

If the overload relay is caused to function so as to break the circuit, a reset mechanism is provided to make the switch operative again.

The magnetic contactor 151 and the magnetic reversing switch 127 are of usual construction and need not be illustrated in detail.

The magnetic reversing switch 127 has leading thereto from the line switch 149, three line wires L¹, L², and L³, as shown in Fig. 10.

The controller 111, motors 13, 67, magnetic brakes 19, 68x, signal light 122, circuit contacts 119, 123, signal light magnetic contact 121, feed motor magnetic contactor 142, time relay 146, magnetic contactor 151, magnetic reversing switch 127, pressure limit switch 109x, feed starting switch 110b, feed limit switch 137 and travel limit switch 108, are all electrically connected, as illustrated in the wiring diagram shown in Fig. 10.

Connected in this manner with switch 115 in "on" position the various operations of the devices are synchronized so that each will operate at the proper moment without permitting the operation of any one device conflicting with the operation of any other device.

This permits the press to continuously operate automatically until such time as some obstacle occurs preventing the further operation of the press, at which time a warning signal will be given to the operator who will immediately stop the press.

By moving the switch 115 to the "off" position, the press may be operated manually moving the ram upwardly by operating the switch 132, moving the ram down by operating the switch 133 or feeding the loading slide by operating the switch 134.

These switches 132, 133 and 134 are never operated collectively when the press is being manually operated.

As soon as the existing difficulty has been overcome and the ram and loading slide 74 are in their proper positions relatively to each other, the operator may move the switch 115 on the "on" position and the press will operate automatically without further attention of the operator.

The die head 35 is moved down through the medium of the spring 55 beneath the cap 53 secured to the plunger 31 by means of the pins 54.

When these elements 35, 55, 31, 53 comprising the movable ram move downwardly as a unit so that the dies 50 on the upper half 43 of the mold come into contact with the molding material in the cavities 51 in the lower mold 34, the continued downward movement of the ram will compress the material and during this compression the die head 35 will be retarded in its downward movement while the plunger 31 and cap 53 will continue to move downwardly causing the compression of the spring 55 in the chamber 52 of said die head 35.

When the initial compression of the material has been effected and the plunger 31 has been stopped in its downward movement, the spring 55 will remain under compression and the tendency of this spring to expand will give a follow-up pressure to the molding material necessary to successfully mold material subject to volumetric changes until the die head 35 again moves upwardly a sufficient distance to allow the full expansion of the spring.

While the molding material in the cavities 51 are being subjected to this pressure, said molding material is being cured by the steam or other heating element flowing through the passages 44 in the molds 34, 43.

It will be understood that when the molding material is subjected to heat in the molds 34, 43 to cure the same, it becomes plastic and flows with the particles thereof adhering to each other.

This action causes the material in the molds to occupy less space and the initial compression having been completed it is quite essential that there should be a follow up pressure to further compress the material and cause the material to fill in all the unoccupied spaces between the outer walls of dies 50, the lower ends of kick-off pins 49 and the inner walls of the cavities 51 in the lower mold 34.

This is accomplished by the expansion of the spring 55 which is resilient and yielding, thus providing a means whereby the follow-up pressure on the material is gradual and will insure that the molding material will form a more compact and homogeneous molded article.

It has been found in practice that better results are obtained by this gradual follow-up pressure on the material than could possibly be attained by imparting a sudden pressure to the material.

When a sudden impact is made upon the molding material, a part of the material will be thrown out of the cavities which is obviously very objectionable.

In other words, it is very essential to have a follow-up pressure on the molding material after its initial compression and during the curing operation and the best results are obtainable only by having the follow-up pressure gradual.

When the die head 35 starts on its upward movement the follow-up pressure will gradually decrease until the spring 55 is again fully expanded.

It is this follow-up pressure upon the material after the initial compression of the molding material that permits a longer period of curing of the molding material and insures greater rigidity and strength to the molded articles.

Having thus described our invention, we claim:

1. In a molding press having a movable ram, a stationary platen and a two-part mold; an open ended hopper; a slide movable horizontally beneath the open end of said hopper and having pockets therein; means for discharging molding material at a predetermined time from said hopper into said pockets and delivering same to the mold; means for opening the press at a predetermined time; means for ejecting molded pieces from the mold; a swinging delivery chute for transferring said molded pieces from said mold; and means for tilting said chute to discharge the molded articles from the press.

2. In a press of the character described for molding thermoplastic materials including a movable ram, a stationary platen and a two-part separable mold; a delivery chute operated synchronously with the travel of said ram to receive the molded pieces ejected from the upper mold and transfer said pieces into position for delivery from the press; and means for tilting said chute at a predetermined time.

3. In a press of the character described for molding thermoplastic materials including a movable ram, a stationary platen and a two-part separable mold; a delivery chute operated synchronously with the travel of said ram to receive the molded pieces ejected from the upper mold and transfer said pieces into position for delivery from the press; a support for said chute provided with a square hole having a helical twist therein; a square rod movable with said ram and having the twist therein fitting said hole.

4. In a molding press of the character described having at its upper end a vertically movable die head; a plunger extending therethrough and imparting movement thereto; an upper mold carried thereby; a die depending therefrom; a stationary mold having a cavity to receive said die; a kick-off pin extending through said die; a cross bar above said mold having limited vertical movement on said die head and to which said kick-off pin is secured; rods extending upwardly from said cross bar and movable through ears on said die head; springs for normally retaining said cross bar in its raised position; and means on the upper ends of said rods coacting with a face on the press frame for forcing said bar downwardly when the die head moves upwardly.

5. In a molding press of the character described having at its upper end a vertically movable die head; a plunger extending therethrough and imparting movement thereto; an upper mold carried thereby; a die depending therefrom; a stationary mold having a cavity to receive said die; a kick-off pin extending through said die; a cross bar above said mold having limited vertical movement on said die head and to which said kick-off pin is secured; rods extending upwardly from said cross bar and movable through ears on said die head; collars on said rods above said ears; springs between said ears and collars for normally retaining said cross bar in its raised position; and means on the upper ends of said rods coacting with a face on the press frame for forcing said bar downwardly when the die head moves upwardly.

6. In a molding press of the character described having at its upper end a vertically movable die head; a plunger extending therethrough and imparting movement thereto; an upper mold carried thereby; a die depending therefrom; a stationary mold having a cavity to receive said die; a kick-off pin extending through said die; a cross bar above said mold having limited vertical movement on said die head and to which said kick-off pin is secured; rods extending upwardly from said cross bar and movable through ears on said die head; collars on said rods above said ears; springs between said ears and collars for normally retaining said cross bar in its raised position; and adjustable sleeves on the upper ends of said rods coacting with a face of the press frame for forcing said bar downwardly when the die head moves upwardly and said sleeves contact with a shoulder on the press frame.

7. In a press of the class described for molding thermoplastic materials; a vertically movable die head; a mold thereon; a die projecting downwardly therefrom; means for kicking off the molded article from said die; a swinging delivery chute movable, while in horizontal position, beneath said die prior to the kick-off operation; and means for tilting the chute when it is returned to its normal position.

8. In a press of the class described for molding thermoplastic materials; a vertically movable die head; a mold thereon; a die projecting downwardly therefrom; means for kicking off the molded article from said die; a swinging delivery chute movable, while in horizontal position, beneath said die prior to the kick-off operation; and a fixed cam member for tilting the chute when it is returned to its normal position.

9. In a press of the character described for molding thermo-plastic materials including a movable ram at the upper end thereof, a stationary platen and a two-part separable mold of which one part is movable with the ram and the other stationary; a delivery chute movable into position to receive the molded pieces ejected from the upper mold and transfer said pieces from the path of said ram into position for delivery from the press; a swinging arm on which said chute is mounted; and means carried by and movable with said ram for imparting a swinging movement to said arm.

10. In a press of the character described for molding thermo-plastic materials; a vertically movable die head at the upper end thereof; a nonrotatable plunger extending therethrough and imparting movement thereto; an upper mold carried by said die head; two dies depending therefrom; a stationary mold having two closed cavities to receive said dies; two kick-off pins extending through said dies; a cross bar above said upper mold having limited vertical movement and to which said kick-off pins are secured; rods extending upwardly from said cross bar and movable through ears on said die head; springs for normally retaining said cross bar in its raised position; and means on the upper ends of said rods coacting with a face of the press frame for forcing said bar downwardly when the die head moves upwardly.

11. In a press of the character described for molding thermo-plastic materials; a vertically movable die head at the upper end thereof; a nonrotatable plunger extending through the die head and imparting movement thereto; an upper mold carried by said die head; a die depending therefrom; a stationary mold having a closed cavity to receive said die; a loading slide adapted to convey molding material to said cavity; three bars extending upwardly from said die head and movable therewith, and mechanisms associated with said bars and actuated thereby for limiting the upward travel of the die head, the downward movement of the plunger; and the starting of the reciprocation of the loading slide.

12. In a press of the class described for molding thermo-plastic materials; a vertically movable die head at the upper end thereof; a mold thereon; a die projecting downwardly therefrom; a tiltable swinging delivery chute having a vertical wall at one end and opposite sides thereof adapted to be moved beneath said die at each upward movement of said die head; means for tilting said chute during its forwardly swinging movement; and a brush secured to the vertical end wall of said chute adapted in the swinging movement of said chute to remove surplus material from said die.

JASPER DERRY.
EDWIN A. TERKELSEN.